(12) United States Patent
Bettez et al.

(10) Patent No.: US 7,898,439 B2
(45) Date of Patent: Mar. 1, 2011

(54) BICYCLE RENTAL SYSTEM AND STATION

(76) Inventors: Isabelle Bettez, Vaudreuil-sur-le-Lac (CA); Jean-Sebastien Bettez, Hudson (CA)

(*) Notice: Subject to any disclaimer, the term of this patent is extended or adjusted under 35 U.S.C. 154(b) by 343 days.

(21) Appl. No.: 12/052,309

(22) Filed: Mar. 20, 2008

(65) Prior Publication Data

US 2009/0240575 A1 Sep. 24, 2009

(51) Int. Cl.
*H04B 14/00* (2006.01)
(52) U.S. Cl. ............... 340/999; 340/432; 340/543; 340/568.1; 194/205; 194/247; 194/902; 235/381; 235/382; 70/233; 70/57
(58) Field of Classification Search ........... 340/999, 340/432, 543, 568.1, 825.35; 705/1; 194/205, 194/247, 902; 235/381, 382; 70/233, 57
See application file for complete search history.

(56) References Cited

U.S. PATENT DOCUMENTS

| | | | | |
|---|---|---|---|---|
| 5,917,407 | A * | 6/1999 | Squire et al. | 340/432 |
| 6,888,472 | B2 * | 5/2005 | Yoshimura et al. | 340/825.22 |
| 2002/0008624 | A1 * | 1/2002 | Paek | 340/572.1 |
| 2004/0122688 | A1 * | 6/2004 | Janda | 705/1 |
| 2006/0212344 | A1 * | 9/2006 | Marcus et al. | 705/13 |
| 2007/0239465 | A1 | 10/2007 | LeGars | |

FOREIGN PATENT DOCUMENTS

| | | |
|---|---|---|
| CA | 2039435 C | 9/1992 |
| CA | 2039503 A1 | 10/1992 |
| CA | 2046386 C | 1/1993 |
| CA | 2116961 A1 | 3/1993 |
| CA | 2064178 A1 | 9/1993 |
| CA | 2074997 A1 | 1/1994 |
| CA | 2081034 A1 | 4/1994 |
| CA | 2091726 A1 | 9/1994 |

(Continued)

OTHER PUBLICATIONS

IT World Canada.com "Wireless, solar power drives Montreal bike rentals" Nov. 11, 2008.

(Continued)

*Primary Examiner* — George A Bugg
*Assistant Examiner* — Ojiako Nwugo
(74) *Attorney, Agent, or Firm* — Wolf, Greenfield & Sacks, P.C.

(57) ABSTRACT

A bicycle rental system and automated station that may be integrated with an automobile parking payment and management system. Users may pay for parking and/or rent and pickup bicycles at the station. The station has a meter, bicycle docks, and power plant. Transaction formalities for parking payment and rental may be handled at the meter. The bicycle docks each are adapted to secure a bicycle. The power plant uses a solar panel to collect power and stores it in energy storage device. Low-power operation may be achieved by placing some electronics in a low-power mode. Each bicycle dock may have a trigger mechanism that when activated powers on associated electronics. The bicycle docks may be divided among a number of bicycle modules. The bicycle modules provide flexibility and modularity so that the number of bicycle docks at a station may be changed.

16 Claims, 14 Drawing Sheets

FOREIGN PATENT DOCUMENTS

| | | | |
|---|---|---|---|
| CA | 2162384 | A1 | 12/1994 |
| CA | 2102339 | A1 | 5/1995 |
| CA | 2142652 | C | 10/1995 |
| CA | 2124129 | A1 | 11/1995 |
| CA | 2154033 | A1 | 1/1996 |
| CA | 2209289 | A1 | 7/1996 |
| CA | 2226325 | A1 | 1/1997 |
| CA | 2262979 | A1 | 2/1997 |
| CA | 2230554 | A1 | 3/1997 |
| CA | 2207588 | A1 | 12/1998 |
| CA | 2279709 | A1 | 2/2000 |
| CA | 2260326 | A1 | 7/2000 |
| CA | 2279078 | A1 | 8/2000 |
| CA | 2352037 | A1 | 12/2002 |
| CA | 2472976 | A1 | 10/2005 |
| CA | 2527616 | A1 | 5/2006 |
| CA | 2519843 | A1 | 3/2007 |
| DE | 4407804 | A1 | 10/1994 |
| DE | 10301887 | A1 | 7/2004 |
| DE | 202006004849 | U1 | 6/2006 |
| EP | 1382519 | A2 | 1/2004 |
| JP | 6108084 | A2 | 4/1986 |
| JP | 2000172747 | A2 | 6/2000 |
| JP | 2001338238 | A2 | 12/2001 |
| JP | 2002008128 | A2 | 1/2002 |
| JP | 2002063646 | A2 | 2/2002 |
| JP | 2002140763 | A2 | 5/2002 |
| JP | 2005078223 | A2 | 3/2005 |
| JP | 2005122675 | A2 | 5/2005 |
| JP | 2005173993 | A2 | 6/2005 |
| JP | 2005202900 | A2 | 7/2005 |
| JP | 2005293402 | A2 | 10/2005 |
| JP | 2006185402 | A2 | 7/2006 |
| KR | 2009/0008485 | | 1/2009 |
| WO | WO 2005/001781 | A1 | 1/2005 |
| WO | WO 2005/049417 | A1 | 6/2005 |
| WO | WO 2005/068280 | A1 | 7/2005 |
| WO | WO 2005/077740 | A1 | 8/2005 |
| WO | WO 2006/014105 | A1 | 2/2006 |
| WO | WO 2006/095092 | A1 | 9/2006 |
| WO | WO 2006/120328 | A1 | 11/2006 |
| WO | WO 2007/020308 | A2 | 2/2007 |

OTHER PUBLICATIONS

International Search Report from corresponding application PCT/IB2009/005466, mailed Oct. 1, 2009.

* cited by examiner

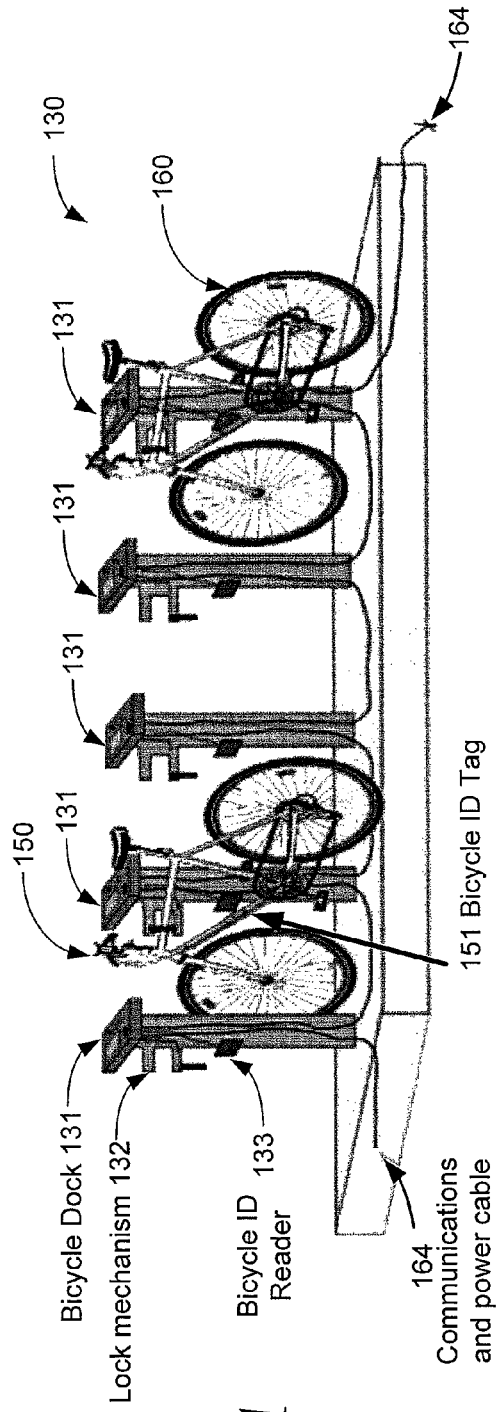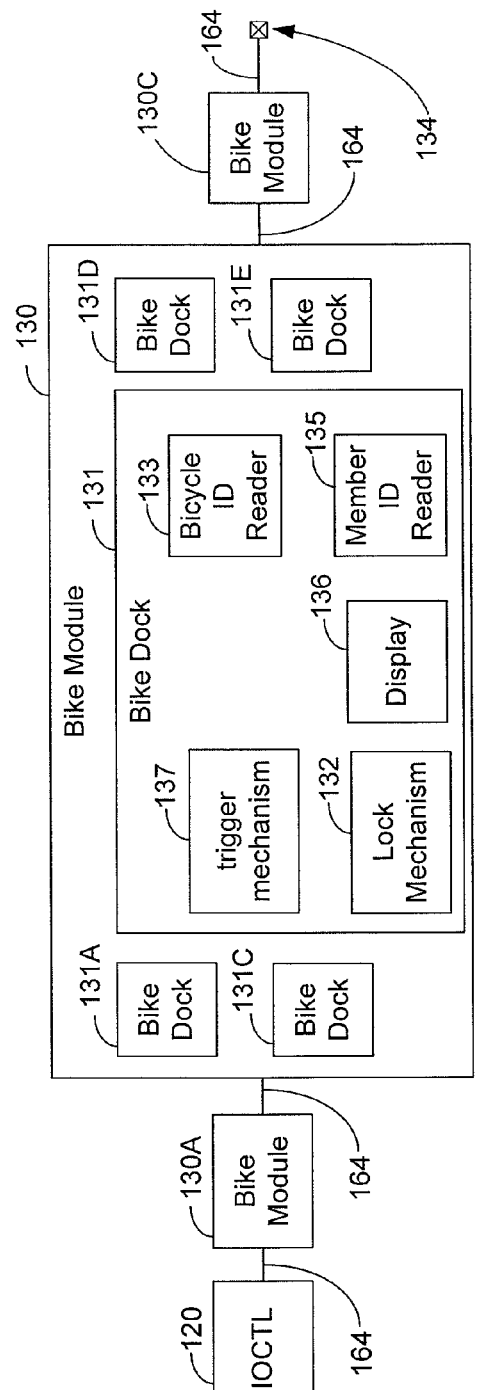

BICYCLE RENTAL SYSTEM AND STATION

BACKGROUND

Some cities are equipped with automatic systems for renting bicycles (bikes). These systems typically have a number of bicycle rental/storage stations located in different parts of the city. Each station enables a customer to rent, pickup, and return a bicycle.

To prevent theft, the bicycles stored at a station are secured to a bollard, post, dock, or other relatively fixed object, by a locking mechanism. The locking mechanism may release the bicycle once a rental has been validated. The bike then becomes available to the customer for use.

When the customer wishes to return the bicycle, the bicycle is returned to the bollard and again secured with the locking mechanism. In some bicycle rental systems, the bicycle may be returned to a bollard at any station.

People who do not chose to use bicycles for transportation may travel by car. Motorists find it is frequently necessary to periodically stop a vehicle and leave it unoccupied for a time. For this purpose, parking spaces may be designated for the temporary storage of vehicles. To prevent abuse and/or as a source of revenue, these parking spaces may be metered, requiring motorists to pay to park.

To collect payment, a parking meter may be located in close proximity to the parking space. This parking meter may be used to meter a single space, or a group of spaces. These spaces may be in close proximity to the meter on the side of a street, or part of a parking lot. For example, the assignee of the present application provides an automated parking payment and management system.

SUMMARY

An integrated automobile parking payment and management system and bicycle rental system are presented. In this way, the same infrastructure can support motorists paying for parking and bicyclists renting bikes. To enable deployment of such a system throughout a wide area, stations, which may provide for parking payment, bicycle rental or both, may be solar powered, which may be enabled through the use of power savings features.

In some embodiments, customers may pay for parking or pickup or return bicycles at an automated station. The automated station may have a parking/bike meter, bicycle docks, input/output control (ioctl) module, and power plant. The bicycle docks may be divided among a number of bicycle modules. The bicycle modules may be secured in place at the station, but may also provide flexibility such that they may be added to or remove from a station to meet customer demand. The ioctl module may be used for communication between the meter and the bicycles modules. The power plant acts as a power source for the station and has a solar panel and energy storage device. Low-power operation may be achieved by placing some electronics in a low-power mode. Each bicycle dock may have a trigger mechanism that when activated powers on associated electronics.

In one aspect, the invention relates to a bicycle rental station. The station has a solar panel, trigger mechanism, energy storage device, and a plurality of bicycle docks. The energy storage device is coupled to receive energy from the solar panel. Each of the plurality of bicycle docks comprises an electronic element. Each electronic element is coupled to receive energy from the energy storage device. In response to activation of the trigger mechanism, one of the electronic elements is powered on.

In another aspect, the invention relates to a method of operating a bicycle rental station. According to the method a portion of the station is placed in a low-power consumption mode. Solar energy collected by a solar panel is stored in an energy storage device. The portion of the station is powered on from the energy storage device in response to activation of a trigger mechanism.

In yet another aspect, the invention relates to a method of operating a bicycle rental/parking payment meter. According to the method, selectable options are displayed on a display. The selectable options comprise a bicycle rental mode and a parking payment mode.

BRIEF DESCRIPTION OF DRAWINGS

The invention and embodiments thereof will be better understood when the following detailed description is read in conjunction with the accompanying drawing figures. In the figures, elements are not necessarily drawn to scale. In general, like elements appearing in multiple figures are identified by a like reference designation. In the drawings:

FIG. 5A is a sketch of a bicycle module according to an embodiment of the invention;

FIG. 5B is a block diagram of a portion of the parking payment/bicycle rental station;

DETAILED DESCRIPTION

The inventors have recognized and appreciated that, although generally used for different reasons by different people, automated parking payment and management and bicycle rental services may be combined to yield synergies. An embodiment of the invention provides a single automated meter at which parking may be paid for and a bicycle may be rented. In some embodiments, the meter may be part of a station, which in turn may be part of a larger network of stations. Further, in some embodiments the network of stations may be managed by a hosting center, which can process common aspects of bicycle rental and parking payment transactions, such as managing payments or maintaining databases.

A station may have sufficiently low power requirements such that it is operable from power collected from a solar panel and stored in an energy storage device. During inactive periods, the station may enter a low-power consumption mode. Activation of a trigger mechanism may cause a portion of the station to power on. Other power management features may be included to also enable operation within available power levels. For example, the meter may feature a modular display socket for connecting different display types to accommodate seasonal variations. For example, a lower power display may be used in the winter when less sunlight is available. Similarly, a smaller display or display with more limited functionality may be used to accommodate cold weather operation.

Figure 1:
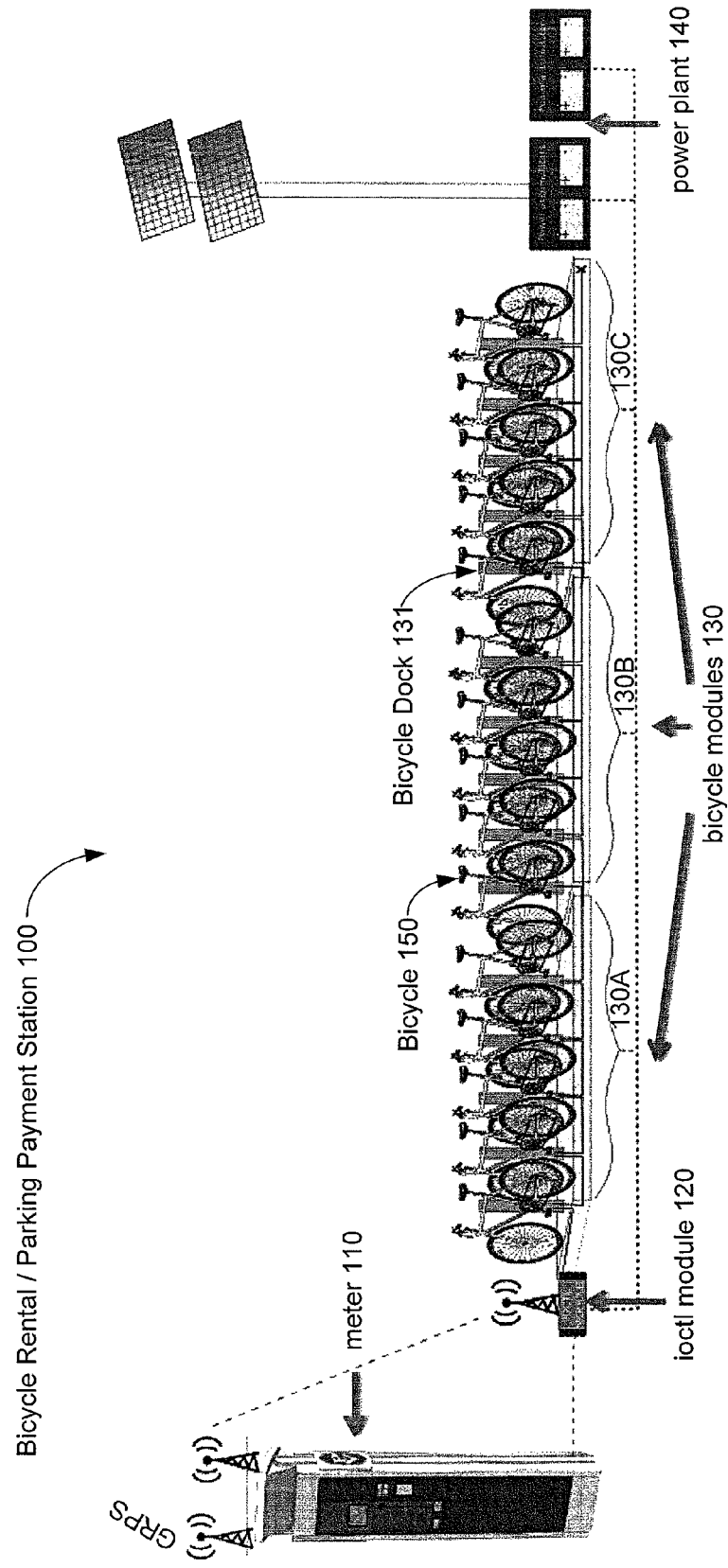
FIG. 1 is a sketch of a parking payment and bicycle rental station.
Figure 2:
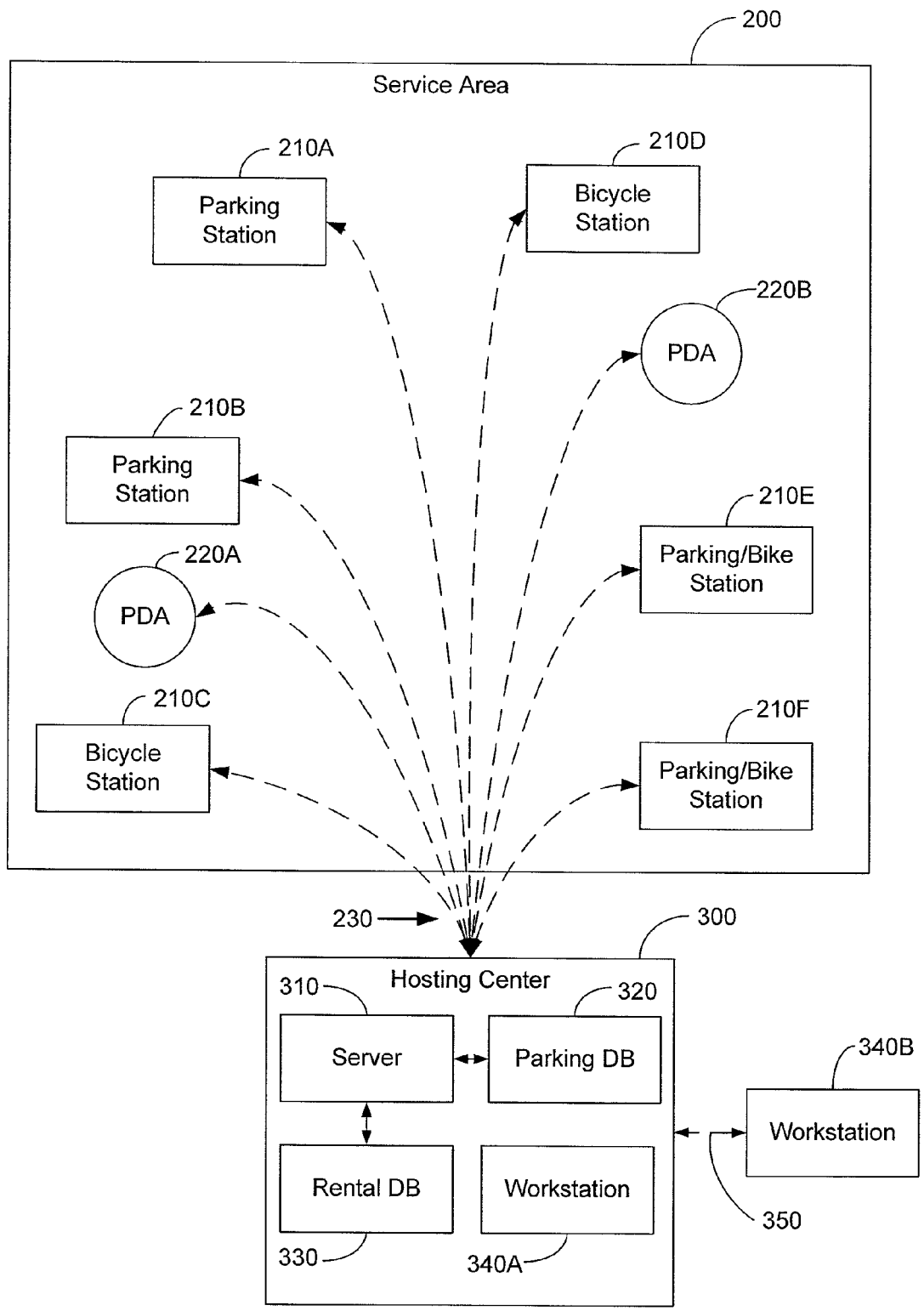
FIG. 2 is a block diagram of a system according to an embodiment of the invention.

Overview: with Reference to FIGS. 1-2

FIG. 1 is an illustration of a parking payment/bicycle rental station 100, i.e., station, according to some embodiments. The station 100 may have a meter 110, input/output control (ioctl) module 120, a number of bicycle docks 131, and a power plant 140. According to some embodiments the station 100 is in proximity to automobile parking spaces. Though not shown in FIG. 1, the parking spaces may be in any suitable location, such as on a nearby street, in a parking lot or in a garage.

The meter 110 provides a user interface for a customer to arrange for parking and/or rent a bicycle. In some embodiments, the meter will provide a mechanism for a customer to pay for parking or for usage of a bicycle. However, the invention is not limited to use in conjunction with systems in which parking or bicycle "rental" requires payment of a fee. Meter 110 may alternatively or additionally provide a mechanism for the system and users to exchange information, such as to identify a user "renting" a bicycle or to indicate a scheduled return time of a bike.

Meter 110 may be implemented using mechanisms known for automated meter systems for parking. However, those techniques may be modified to support transactions with individuals performing bicycle rental related operations. For example, parking meters that present a user interface, receive user input and process payments are known and may be implemented using computer processors programmed to perform parking payment functions. However, any suitable mechanism may be used to implement meter 110.

Meter 110 may include a mechanism to communicate with one or more bicycle modules 130. Modules 130 may include a mechanism to store bicycles and secure them until rented, but release them under control of meter 110 when they are rented. In addition, modules 130 may include a mechanism to sense status information related to bicycles, such that a bicycle has been returned, and communicate that status information to meter 110.

In the embodiment illustrated, bicycles 150 are secured to bicycle docks 131. In some embodiments, when a bicycle is rented by a user the meter 110 may transmit to the ioctl module 120 information specifying the bicycle dock 131 at which the rental bicycle is stored. The bicycle docks 131 may be divided among one or more bicycle modules 130. This provides flexibility for bicycle docks to be easily added, removed, and relocated. In the illustrative example, three bicycles modules, modules 130A-C, are shown. However, a station 100 may have any number of bicycle modules.

Operation of both meter 110 and bicycle modules 130 may require electric power to operate computers or wireless communication mechanisms, sense status related to bicycles, actuate locking mechanisms or perform other suitable functions. In the embodiment illustrated, power for these operations is derived from solar power. Though wired power connections or other sources of power may be used, solar power may facilitate easy deployment of stations throughout a wide area.

Accordingly, station 100 may include a power plant 140. Power plant 140 may use a solar panel and energy storage device (ESD) to provide sufficient solar power such that the station 100 may be run without a connection to a power source external to the station.

Station 100 may be part of a system of stations. FIG. 2 is a block diagram showing a system having a service area 200 and hosting center 300. The service area 200 may have a number of stations 210A-F. Each station 210A-F may be similar to station 100 (FIG. 1). However, the stations may be of a variety of service capabilities. In the figure, station 210A and station 210B are both parking stations while station 210C and station 210D are both bicycle stations. Station 210E and station 210F are hybrid parking/bike stations.

These service capabilities are exemplary and alternate and/or additional services may be provided by some station. For example, a station may provide automated-teller machine (ATM) services.

The stations 210A-F may be in communication with the hosting center 300 via connections 230. Hosting center 300 may be a center used as is known in the art for management of interactions with parking pay station. The hosting center may perform functions related to a pay-parking system, such as processing electronic payments based on user input entered at pay stations distributed over a wide area, tracking status of stations, detecting faults, scheduling maintenance or other suitable operations.

Hosting center 300 may be implemented using mechanisms as known in the art for hosting centers for pay-parking systems. These mechanisms may include one or more servers programmed to perform suitable functions. These mechanisms may also be adapted to perform functions that support a distributed bicycle rental system.

In the embodiment illustrated, the hosting center 300 serves as the central repository of information used by the system. The hosting center 300 may have any number of servers 310 for processing payment information and managing bicycle rentals, parking spaces and other system information. The hosting center 300 may have a parking database 320 that stores information related to parking. The hosting center 300 may have rental database 330 that stores information related to bicycle rental. These and other databases may be accessible to the server 310.

The hosting center 300 may also support the connection of a portable digital assistant (PDA) 220A-B. PDA's may be used by parking officers for parking enforcement or by mobile technicians to monitor any problem that might occur with the stations. This same infrastructure may be adapted for use in connection with bicycle rentals. For example, PDA's may be used to report damaged, defective, or missing bicycles.

The hosting center 300 may also have any number of workstations such as workstation 340A which is local to the hosting center, or workstation 340B which remotely connects to the hosting center via connection 350. Workstations may be used by operator officers to monitor, configure, and support the system. For example, a price change could be controlled from a workstation.

Station 100: with Reference to FIGS. 3-5B

Figure 3:
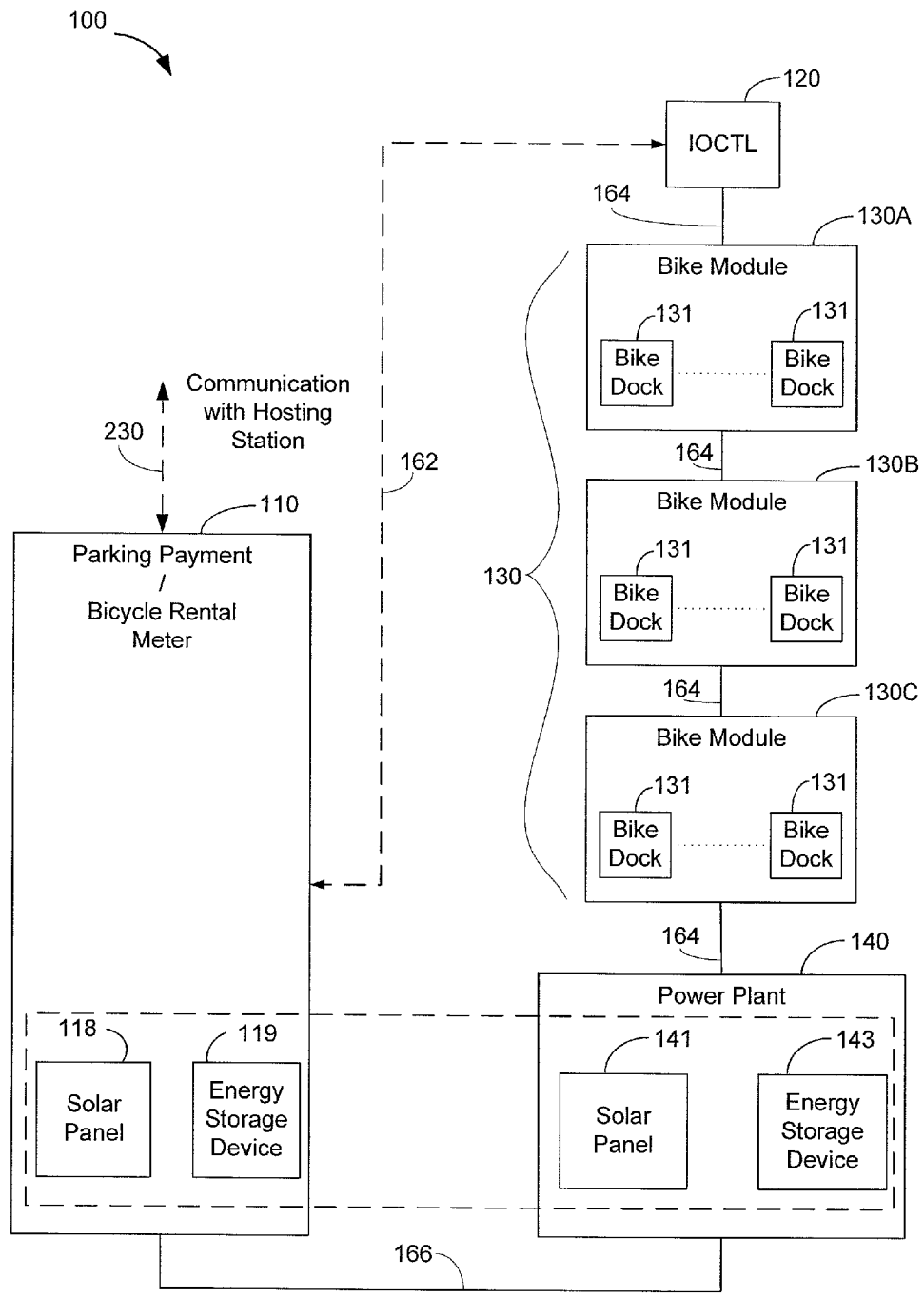
FIG. 3 is a block diagram of a parking payment and bicycle rental station.

FIG. 3 is a block diagram of a parking payment/bicycle rental station 100 that mirrors the embodiment of station 100 illustrated in FIG. 1. The structural components of the parking payment/bicycle rental meter 110 are described in detail with reference to FIGS. 4A-F. The structural components of the bicycle module 130A-C and bicycle docks 131 are described in detail with reference to FIGS. 5A-B.

A station 100 is shown having a meter 110, ioctl module 120, bike modules 130A-C and power plant 140.

The meter 110 is in communication with hosting station 300 (FIG. 2) via connection 230. Connection 230 may be a wireless connection, though in other embodiments, a telephone landline or other suitable wired connection may be used. As one example, connection 230 may be implemented using a WWAN, such as a cellular network.

The meter 110 is in communication with ioctl module 120 via connection 162. Connection 162 may also be a wireless connection, though in other embodiments, a wired connection may be used. As one example, connection 162 may be implemented using wireless LAN or PAN technology.

The ioctl module 120 is connected to each of the bicycle docks 131 via communications and power cable 164. With these connections, status and control information can be exchanged between bicycle docks 131, meter 110 and hosting center 300.

Each bicycle dock 131 securely stores a bicycle and may include one or more sensor and actuators to obtain status information about bicycles (such as whether a bicycle is present or the condition of the bicycle) and to hold or release the bicycle in response to electronic commands.

Here the bicycle docks 131 are shown as part of bicycle modules 130. Three bicycle modules 130A-C are shown, however any number of bicycle modules may be used. The bicycle modules 130A-C may be interconnected via communications and power cable 164. Here the modules are shown daisy chained, however, any suitable connection method may be used.

The station 100 may also have a power plant 140. The power plant collects solar energy via solar panel 141 and stores this energy in an energy storage device (ESD) 143. In some embodiments ESD 143 is a battery. Power from the power plant 140 provides power via power cable 164 to operate bicycle docks 131, and ioctl module 120. The meter 110 may have a solar panel 118 and an ESD 119. In some embodiments power stored by ESD 119 is shared with power stored by ESD 143 via power cable 166 to facilitate powering each of the station components. In some other embodiments the solar panel 118 and ESD 119 of meter 110 only provide power for meter 110. Alternatively, in some embodiments, the station 100 is directly connected to an external power source.

Figures 4A, 4B:
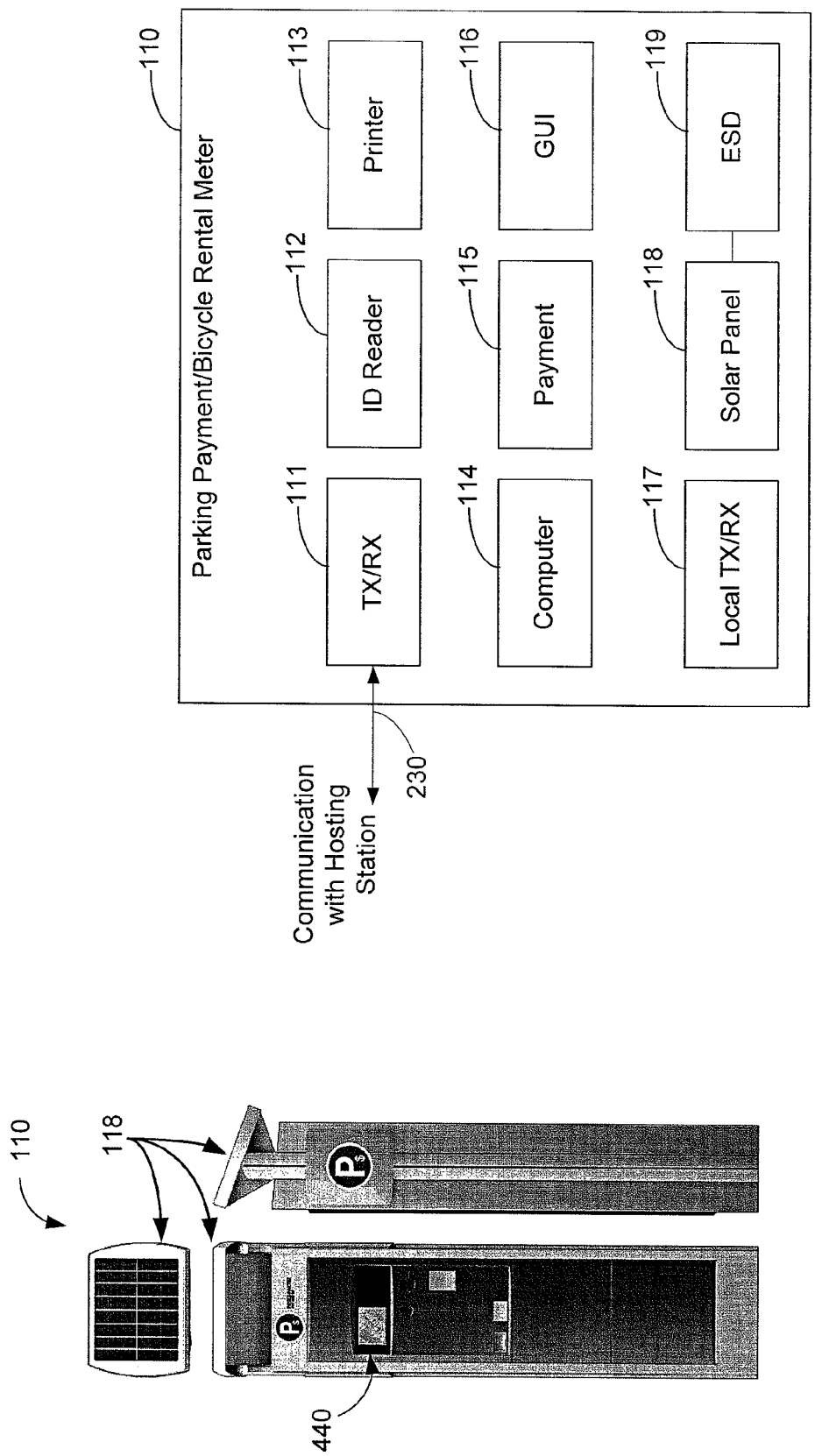
FIG. 4A is an illustration of a parking payment and bicycle rental meter.
FIG. 4B is a block diagram of a parking payment and bicycle rental meter.

FIG. 4A is an illustration of meter 110 according to an embodiment of the invention. FIG. 4B is a block diagram of the meter 110 illustrated in FIG. 4A. Meter 110 may provide a user interface for customers to pay for parking or rent a bicycle. These interfaces may include an ID reader 112, a graphical user interface (GUI) 116, a payment interface 115, a printer 113, and any other interface for facilitating station functions. Operational behavior between devices and interfaces may be coordinated by computer 115. In some embodiments ID reader 112 is a receiver adapted to receive short range wireless communications emitted by a tag on a bicycle, such as an RFID card reader that may receive communications emanating from a tag on a bicycle. (Further details of the user experience at meter 110 are discussed in a subsequent section with reference to FIGS. 6A-B, 7A-F, and 10A-B.)

GUI 116 may comprise a display for presenting visual information. The display may be a touch-screen display. In some embodiments the meter 110 has a modular display socket 440 (FIG. 4A). The modular display socket 440 may provide an electrical coupling to the display and may mechanically secure the display in position. In this way power usage may be tailored to reflect seasonal changes. For example, during the summer season, longer daytime hours may enable more solar power to be collected and permit a large, high resolution, full color display to be used at a station. The same station in the winter may be equipped with a display that uses considerably less power or that is smaller and therefore operates in cold weather using the same amount of power.

Figure 4C:
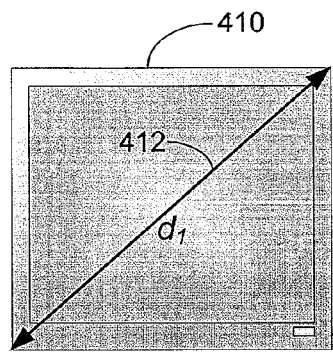
FIG. 4C is an illustration of a small display.

The modular display socket 440 may connect to any of a number of compatible display types. For example, the modular display socket 440 may be adapted to connect to displays of various sizes. FIG. 4C illustrates a small display 410 having a principle dimension 412 of length $d_1$. FIG. 4E illustrates small display 410 electrically coupled to and mechanically secured to the modular display socket 440 in meter 110.

Figure 4D:
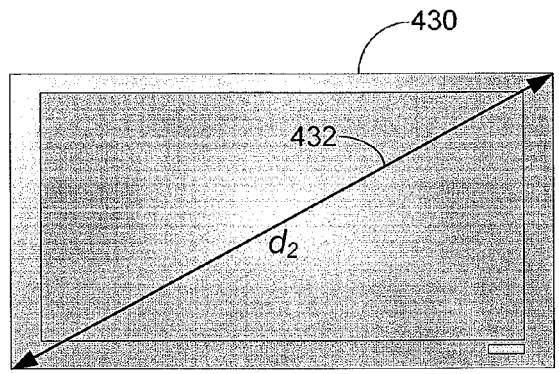
FIG. 4D is an illustration of a large display.
Figure 4E:
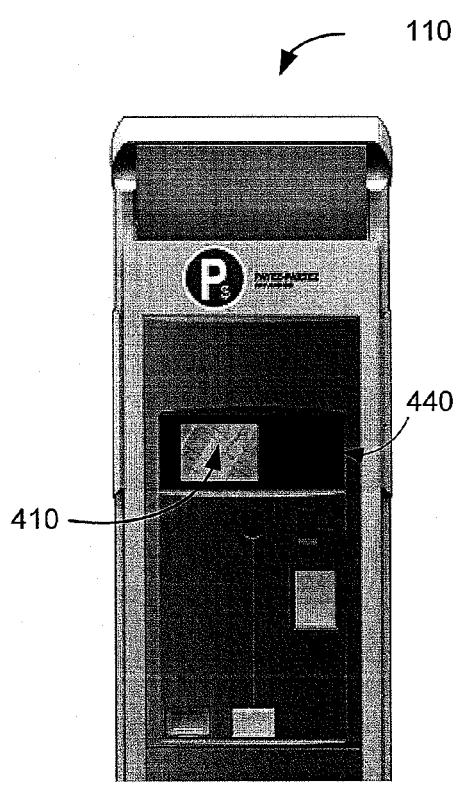
FIG. 4E is an illustration of a small display connected to a parking payment/bicycle rental meter.
Figure 4F:
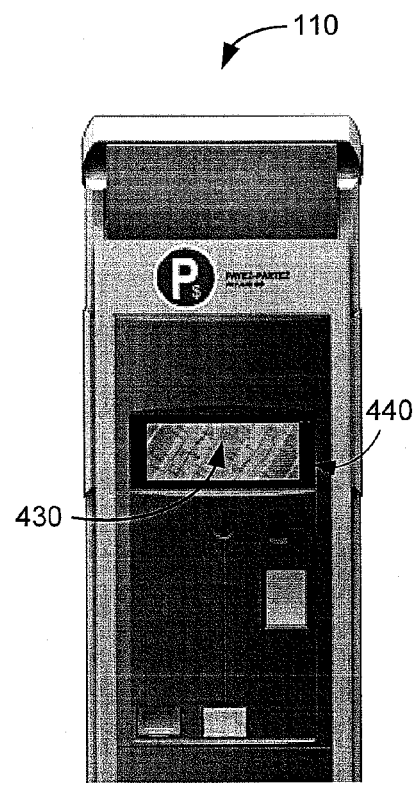
FIG. 4F is an illustration of a large display connected to a parking payment/bicycle rental meter.

FIG. 4D illustrates a large display 430 having a principle dimension 432 of length $d_2$. FIG. 4F illustrates large display 430 electrically coupled to and mechanically secured to the modular display socket 440 in meter 110.

Here, $d_2$ is drawn greater than $d_1$ to emphasize that the modular display socket may be adapted to connect to displays of various sizes.

The modular display socket 440 may be adapted to connect to displays of various resolutions and color depths. For example, modular display socket 440 may be adapted to connect a grayscale display (i.e, black and white or monochromatic display) or a color display. For example screen image 1010 (FIG. 10A) is a gray scale representation of an image displayed on a high resolution color screen. Screen image 1020 (FIG. 10B) is an image of a low resolution black and white display.

Meter 110 has a transceiver 111 for communication information with hosting station 300 via connection 230 (FIG. 2). Connection 230 is formed to enable bidirectional transmission of information related to the services provided at station 100. Connection 230 may be formed using any appropriate communication technology. For example, connection 230 may be formed wirelessly using General Packet Radio Service (GPRS) utilizing Global System for Mobile Communications (GSM), IEEE 802.11, IEEE 802.16, or any other appropriate wireless protocol. Alternatively, a wired connection such as Ethernet, telephone, or any other appropriate wired connection may be used. In some embodiments the connection may be made through the internet or another third party network. Transceiver 111 is appropriate to the selected communication technology for forming connection 230.

Turning now FIGS. 5A-B, FIG. 5A shows an embodiment of bicycle module 130. FIG. 5B shows a block diagram of bicycle module 130 as connected to bicycle modules 130A and 130C and the ioctl module 120.

The bicycle module 130 comprises a number of bicycle docks 131. In the example embodiment illustrated in FIG. 5A, bicycle module 130 has five bicycle docks. The bicycle module may have a communications and power cable 164, which may be connected to adjacent bicycle modules such as bicycle module 130A and 130C, form termination 134, be connected to ioctl module 120 (FIG. 5B), or connected to power plant 140 (FIG. 3). The communications and power cable 164 in the sketch of bicycle module 130 (FIG. 5A), is visible in the illustration, however, the cable may be embedded, or partially embedded in bicycle module 130 and bicycle docks 131.

Each bicycle dock 131 may be equipped with a locking mechanism 132 for securing bicycles. The locking mechanism may be of any suitable type. The locking mechanism 132 may be actuated to lock or unlock using power supplied from the power plant 140 (FIG. 3). The locking mechanism may function in a low-power consumption state. A device in a low-power consumption state may draw a reduced amount of power or no power at all from power plant 140.

The bicycle dock 131 may further comprise a bicycle ID reader 133. Bicycle ID reader 133 may be positioned on bicycle dock 131 such as to be able to read a bicycle ID tag 151 when bicycle 150 is parked at the bicycle dock. Here, RFID is the exemplary technology. However, any appropriate technology may be used to identify bicycle 150. For example a bar code and bar code scanner may be used. Like the locking mechanism 132, the bicycle ID reader 133 may similarly have a low-power consumption state.

The bicycle dock 131 may further comprise a member ID reader 135. Member ID reader may be used to read a "membership card" (not shown). Membership is presently discussed.

In some embodiments of the system customers may choose to become "members." Members may eliminate some or all steps performed at the meter 110 (FIG. 1) and perform formalities of the rental process at bicycle dock 131. This may be facilitated by a membership card and a membership information database stored at the hosting center 300 (FIG. 2).

Members may also eliminate some steps of the parking payment process. In some embodiments parking payment and bicycle rental memberships are differentiated, while in other embodiments, the membership is combined.

In some embodiments the membership card is an RFID card, and member ID reader 135 is an RFID reader. In some embodiments, for example, when RFID is use, the functionality of ID readers 133 and 135 may be consolidated into a single reader.

Any appropriate technology may be used to identify members. For example, members may use cards with a magnetic strip to gain access to bicycle 150. In this case, member ID reader 135 may be a magnetic card reader.

Like the locking mechanism 132 and the bicycle ID reader 133, member ID reader 135 may similarly have a low-power consumption state.

The bicycle dock 131 may further comprise a display 136 (FIG. 5B). The display may be used to communicate information about a given bicycle dock such as the bicycle is damaged and not available or that the dock is broken and not available. Any suitable form of display may be used. In some embodiments, the display may be a textual or graphical display, such as may be formed using an LCD display panel. Though, in some embodiments, other display mechanisms may be used. For example, a display may be formed from LEDs (light-emitting diodes) controlled to communicate information to the user, such as whether a bicycle is damaged or locked to the bicycle dock. The display may also have a low-power consumption state. In some embodiments the low-power consumption state may include first reducing power consumption, and subsequently turning off a device. For example, the display may first dim and then, after a longer period of inactivity go blank. Other components may similarly enter low power states to implement an overall mode of operation that reduces power usage. For example, wireless transmitters and receivers may turn off after a very brief period of inactivity, but a user interface or sensors may remain powered on during a longer period of inactivity. When a device enters a low-power state may be determined by the availability of power or any other suitable way.

To cause the station to return from a low power state, one or more trigger mechanisms may be included. In embodiments in which the system may enter a low power state in which all electronics are powered off, the trigger mechanism may be a mechanical switch. In embodiments in which some electronics components operate in low power mode, the switch may be electronic or mechanical. Separate trigger mechanisms may be included on meter 10 and bicycle modules 130, though in some embodiments, a single trigger mechanism may be employed.

In the example illustrated, bicycle dock 131 may include one or more trigger mechanisms 137. Trigger mechanism 137 may be used to wake-up some of the electronic elements of the dock, bringing these elements out of the low-power consumption state. Devices may be in a low-power consumption state where low or no power is consumed to conserve solar power. The trigger mechanism 137 may take any appropriate form such as a button or a switch. The trigger mechanism 137 may be a mechanical device, or an electronic device. A trigger mechanism 137 may be activated by user action for example, when a bicycle is placed in a bicycle dock or when a user swipes a membership card. In some embodiments, the ioctl module may poll the plurality of bicycle docks to determine if the trigger mechanism has been activated. The ioctl module may contain a wireless transmitter. The wireless transmitter may transmit information to the payment station and receive authorization data from the payment station.

Process Flow of Station 100: with Reference to FIGS. 6A-10B

Station 100 may support various types of activities such as parking payment and bicycle rental or return. To perform these activities, the various aspects of station 100 perform operations in an order determined in part by customer inputs. The operational flow of station 100 is illustrated by the block diagrams of FIGS. 6A-C, 8, and 9.

In some instances, parts of the operation flow performed by meter 110 may have a corresponding image displayed on a display, e.g., small display 410 or large display 430, of the GUI 116 (FIG. 4B). These images may present information to the customer or prompt the customer to enter information. Example illustrations of the screen images are shown by FIGS. 7A-F and 10A-B.

Process flow of station 100 is described as it relates to an exemplary customer experience which begins at meter 110. Beginning at point A 600 in FIG. 6A, the meter 110 may be in a low-power consumption mode which may be entered after a predetermined time without customer activity. If meter 110 is in a low-power mode, at step 602 it may be "woken up" in response to a trigger. For example, a customer may touch the touch-screen display portion of GUI 116.

After waking up, or if low-power consumption mode is not used, meter 110 may present a display of customer options (step 604). Corresponding to step 604, GUI 116 may display screen 710 (FIG. 7A) with the prompt 711 "please make a selection . . . " Here two options are show: option 713 is "pay for parking" and option 715 is "bicycle rental."

At step 606 (FIG. 6A), meter 110 may await a customer selection. Here option 713 and option 715 (FIG. 7A) is understood to correspond with path 608, parking mode, and path 610, bike mode, respectively. In some embodiments more or less options may be available to the customer.

Figure 10B:
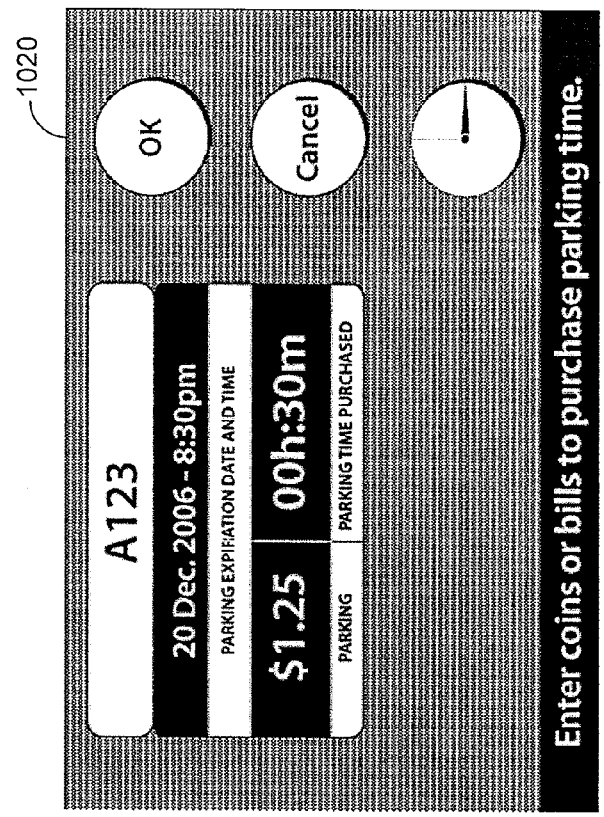
FIG. 10B is a black and white illustration of a low resolution screen presenting a user interface for parking transactions using a payment and management system according to some embodiments of the invention.
Figure 10A:
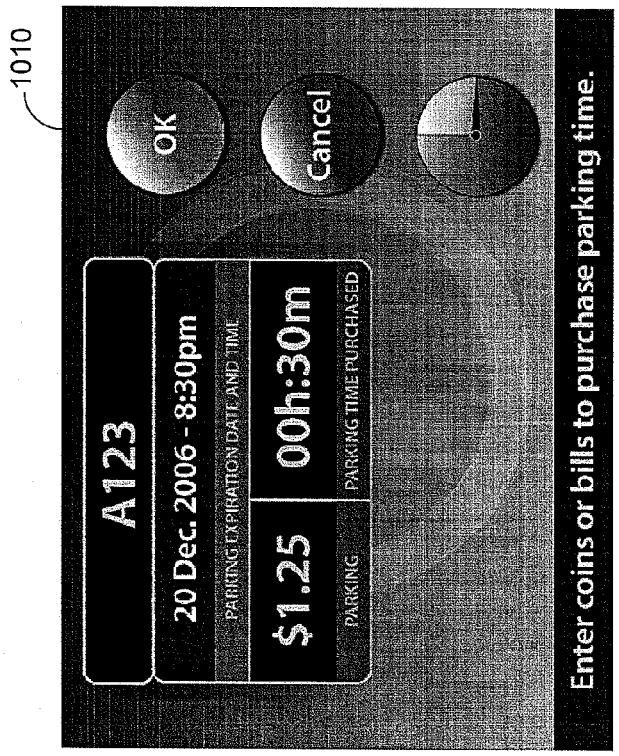
FIG. 10A is a gray scale illustration of a high resolution color screen presenting a user interface for parking payment.

If parking mode is selected, path 608 is followed to step 612. At step 612 any suitable method for accepting parking payment may be performed. FIGS. 10A-B show illustrative screen images 1010 and 1020, respectively. In some embodiments, screen images 1010 and 1020 may be presented by GUI 116 to facilitate parking payment.

Once step 612 is completed the process flow ends at step 618. Meter 110 may return to A 600, enter low-power consumption mode, or perform another suitable operation.

If bike mode is selected, path 610 is followed to step 614. At step 614 additional bicycle rental options may be presented. In the present example, a customer may modify an existing rental agreement, or rent a bicycle. Corresponding to step 614, GUI 116 may display screen 720 (FIG. 7B) with the prompt 712 "please make a selection . . . " Here two options are show: option 723 is "modify rental" and option 725 is "rent bicycle."

Figure 6A:
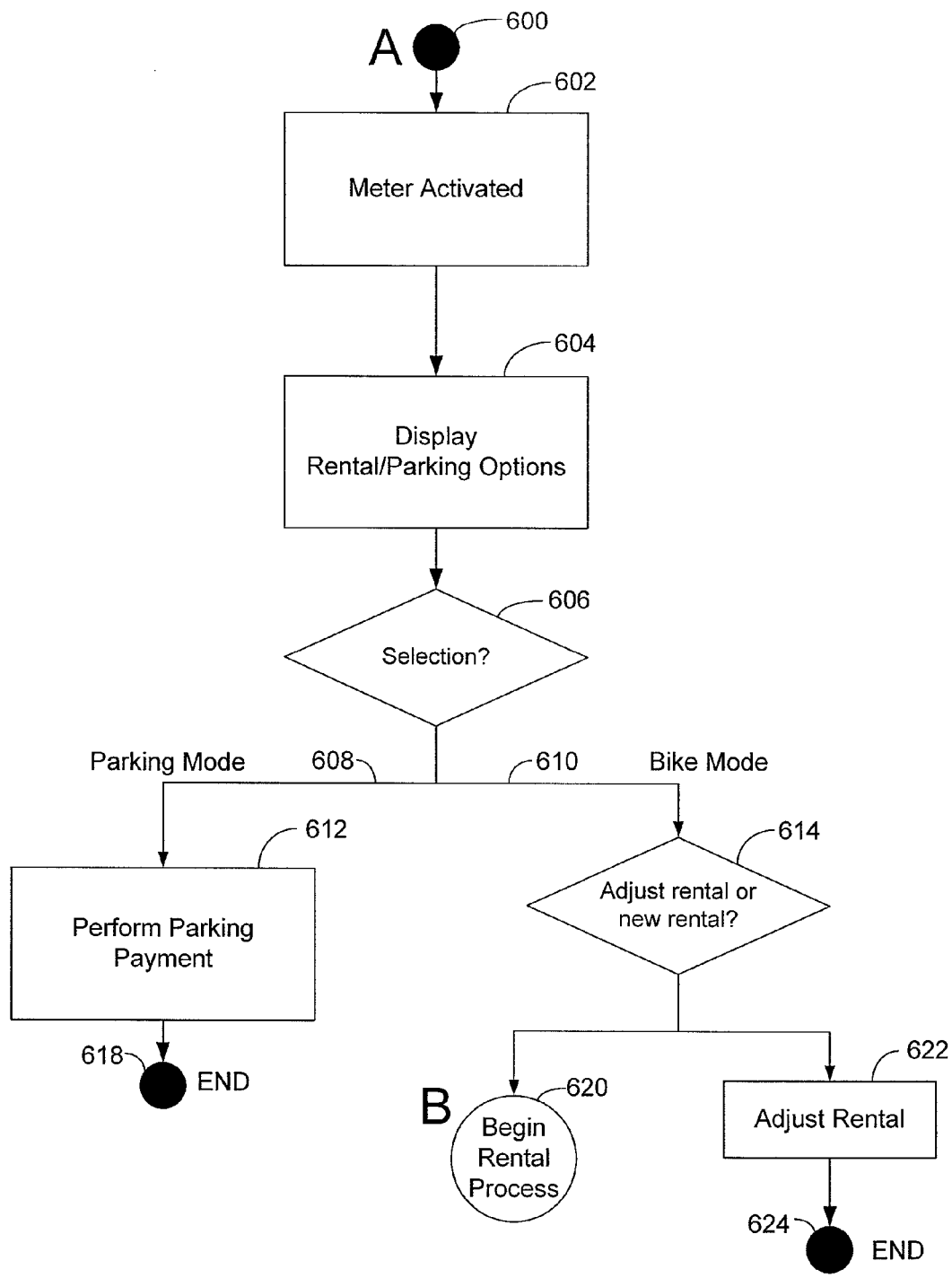
FIG. 6A is a process flow diagram of a portion of a process of operating a parking payment and bicycle rental meter according to an embodiment of the invention.

Process flow continues to step 622 in FIG. 6A if modify rental (e.g., selecting option 723, FIG. 7B) is chosen by the customer. At step 622 a user may adjust the rental. For example, additional rental time may be added, a bicycle may be reported stolen or broken, or a customer may swap bicycles. Upon completion of step 622 process flow ends at step 624. The meter 110 may return A 600 or to another suitable operation.

Figure 7B:
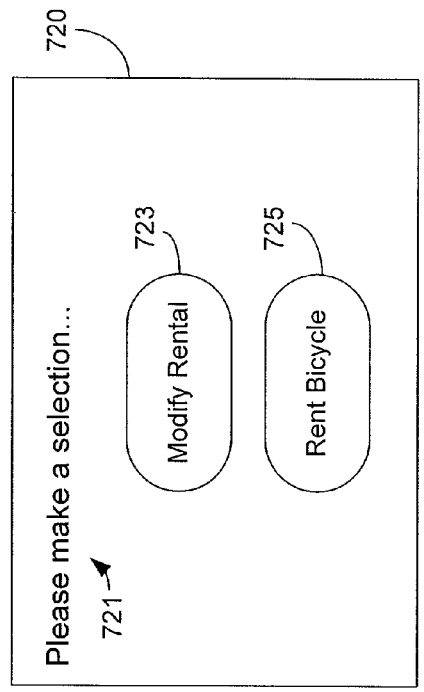
FIG. 7B is a conceptual sketch of a screen for selecting to either modify an existing rental or start a new rental according to an embodiment of the invention.
Figure 7D:
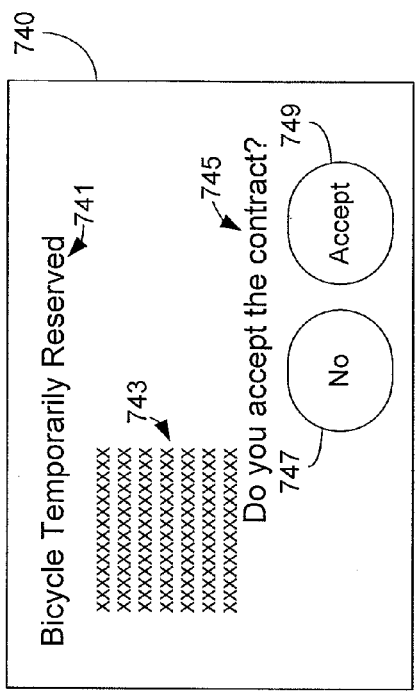
FIG. 7D is a conceptual sketch of a screen for accepting a bicycle rental contract according to an embodiment of the invention.
Figure 7A:
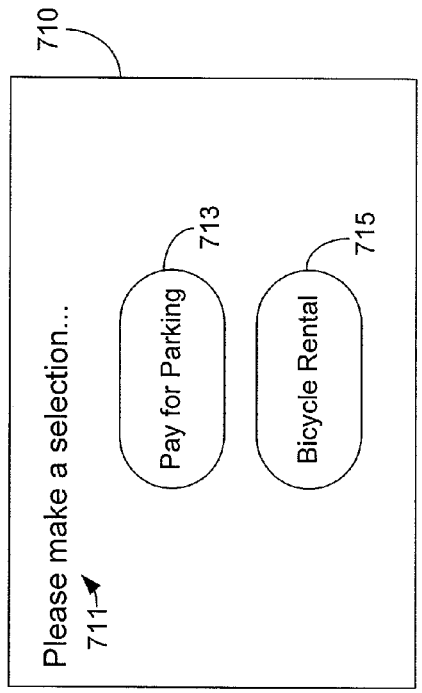
FIG. 7A is a conceptual sketch of a screen for selecting either the parking payment or bicycle rental mode according to an embodiment of the invention.
Figure 7C:
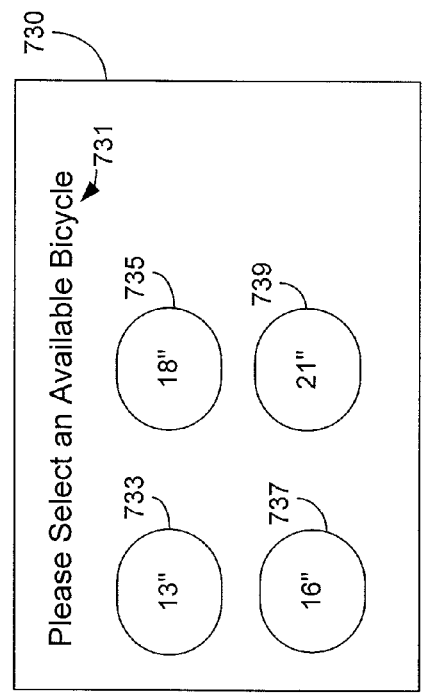
FIG. 7C is a conceptual sketch of a screen for selecting a bicycle according to an embodiment of the invention.
Figure 7F:
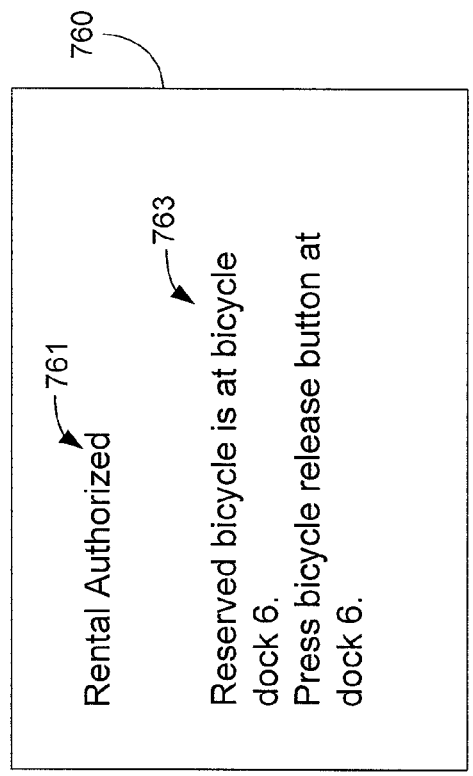
FIG. 7F is a conceptual sketch of a screen presenting instructions for picking up a bicycle according to an embodiment of the invention.
Figure 7E:
FIG. 7E is a conceptual sketch of a screen for prompting a payment according to an embodiment of the invention.

Alternatively, process flow continues to B 620 if a customer chooses to rent a bicycle, for example, by selecting option 725 (FIG. 7B).

Figure 6B:
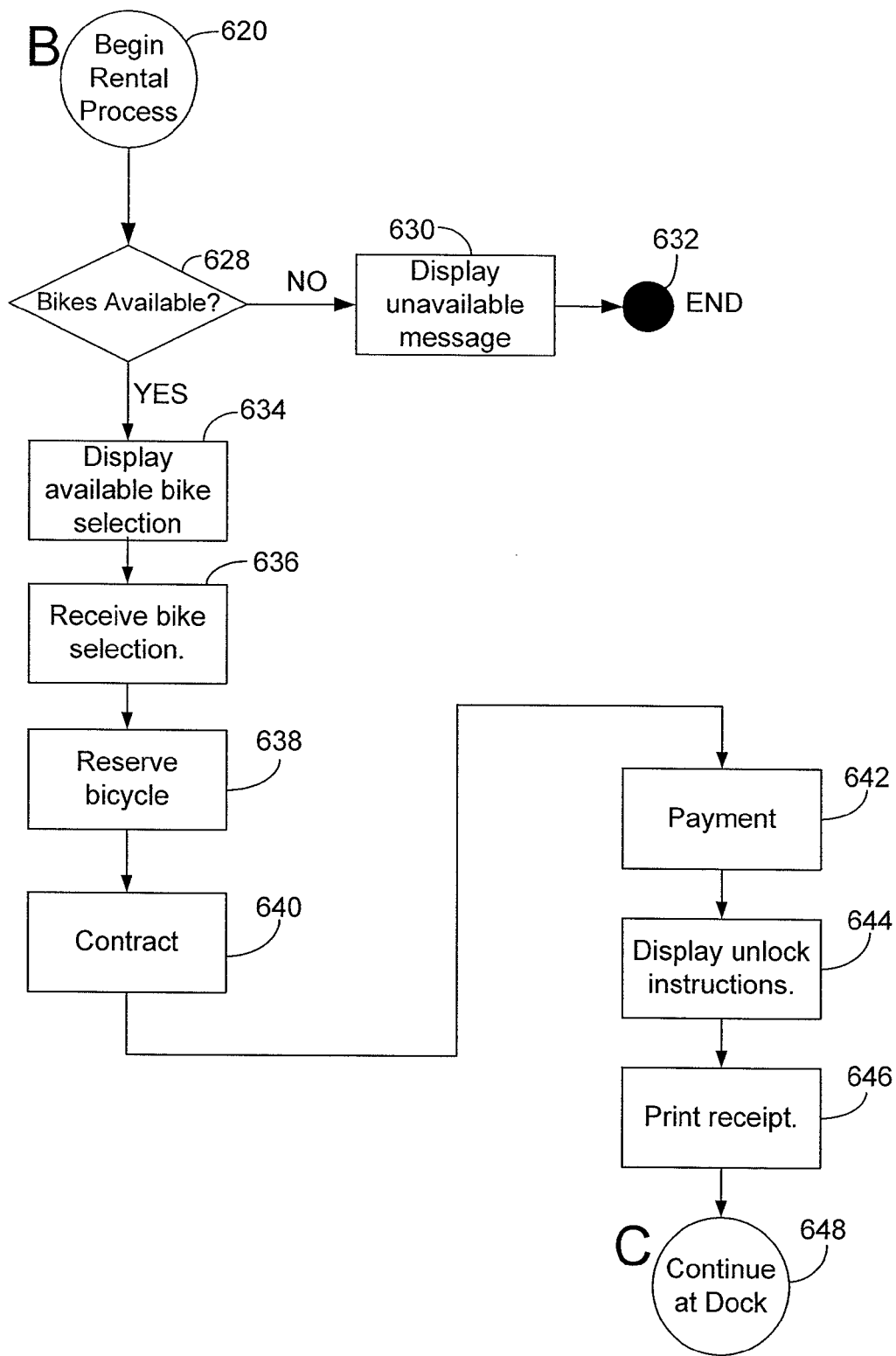
FIG. 6B is a process flow diagram of a portion of a bicycle rental process that may be performed using a meter according to an embodiment of the invention.

The process flow for the bicycle rental process continues from B 620 in FIG. 6B.

At step 628 an inquiry is made as to the availability of bicycles. An update may be made by communicating with hosting center 300 or with ioctl module 120. If bicycles are not available a message indicating such may be displayed (step 630) and the process flow is ended at step 632. The process flow may return A 600 or to another suitable operation. If bicycles are available process flow continues to step 634.

At step 634 an option to select a bicycle is provided to the customer. In some embodiments a customer may select multiple bicycles for rental. Corresponding to step 634, GUI 116 may display screen 730 (FIG. 7C) with the prompt 731 "please select an available bicycle." In this example, screen 730 presents options 733, 735, 737, and 739 which correspond to different bicycle sizes.

At step 636 a customer selection of a bicycle is received.

Process flow may continue to step 638 where the bicycle is temporarily reserved. At step 640 a contract may be presented to the customer. Corresponding to step 640, GUI 116 may display screen 740 (FIG. 7D) with the statement 741 "bicycle temporarily reserved." This may be followed by the contract language 743 and a prompt 745 such as "do you accept the contract?" GUI 116 may display options 747 and 749 correspond to "no," (do not accept the contract) and "accept," (accept the contract), respectively.

Once a user has accepted the contract, process flow continues to step 642 where payment may be made. Payment may be received in any suitable way such as by credit card or through a membership account. Payment may be facilitated, in part, by payment unit 115 of meter 110. Corresponding to step 642, GUI 116 may display screen 750 (FIG. 7E) with the prompt 751 "please insert credit card or member card." In some embodiments, the price may further depend on additional options such as the rental length, type of bicycle, and return location.

Upon receipt of payment, process flow continues to step 644 where instructions are presented to the user. These instructions may include instructions on how to unlock the bicycle. Corresponding to step 644, GUI 116 may display screen 760 (FIG. 7F) with a statement 761 indicating the rental is authorized and a statement 763 with instructions on where and how to unlock the rented bicycle.

At step 646 a receipt may be printed, for example by printer 113 of meter 110. Process flow continues at C 648 to operations which may be performed at bicycle dock 131. This process flow is described with reference to FIG. 6C.

Figure 6C:
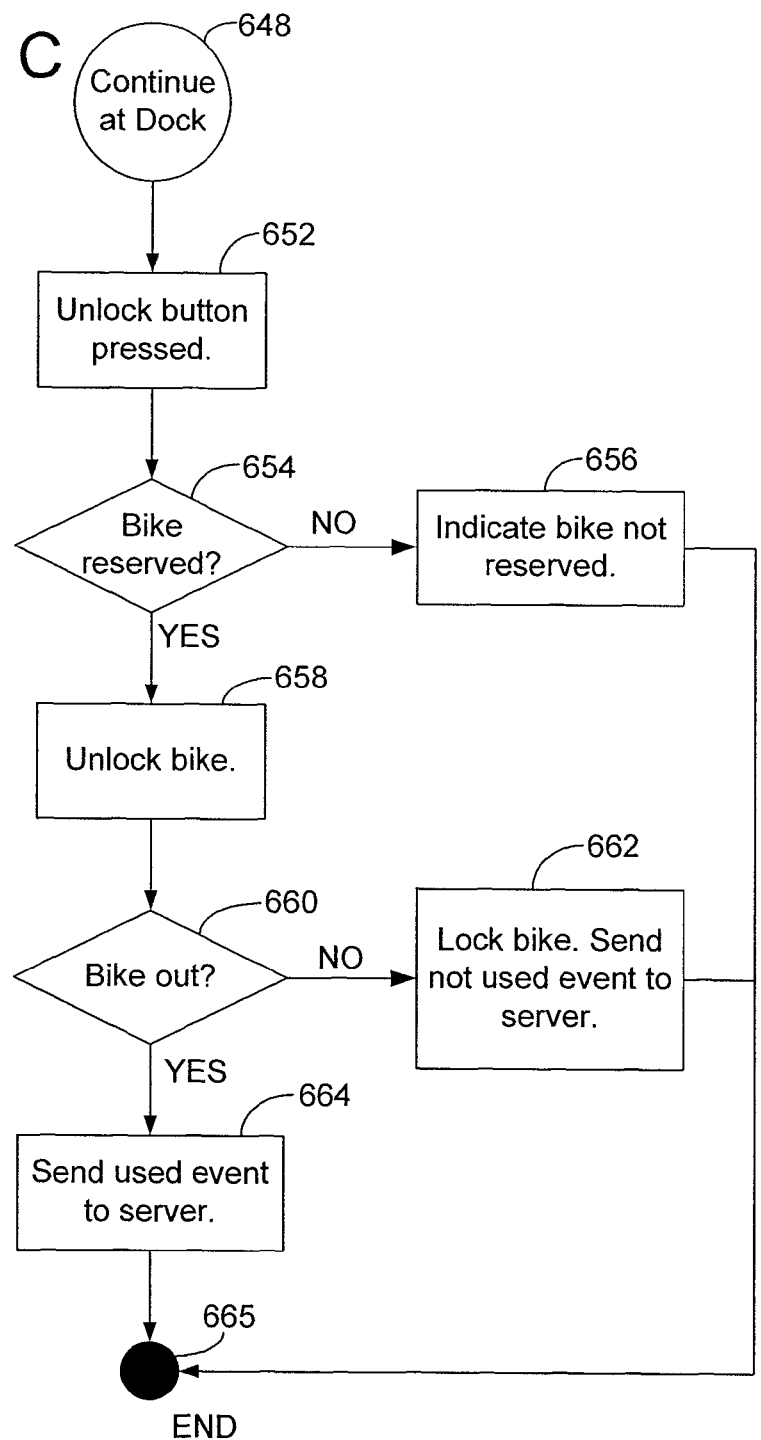
FIG. 6C is a process flow diagram of a portion of a bicycle rental process that may be performed using a bicycle module according to an embodiment of the invention.

Process flow continues from C 648 on FIG. 6C to step 652 where bicycle dock 131 (FIG. 5B) is activated. Activation may, for example, be in response to an activation of trigger mechanism 137. Trigger mechanism 137, for example, may be a button or any appropriate triggering device.

Activation prompts step 654 where it is determined if the bicycle is reserved. If the bicycle is note reserved, process flow continues to step 656 where an indication is provided. This may lead bicycle dock 131 to continue to end step 665 and the dock may enter a standby, or low-power consumption mode.

If however, the bicycle is reserved, process flow continues to step 658 and the bicycle is unlocked.

After a predetermined time step 660 is performed. At step 660 the bicycle dock determines if the bicycle has been removed. If the bike has not been removed, process flow continues to step 662 where the lock is again secured, and a "not used" event is reported. This event may be reported to meter 110 via ioctl module 120 and may further be reported to hosting center 300 for recordation. This may lead bicycle dock 131 to continue to end step 665.

If the bicycle is detected to have been removed at step 660 a "used" event is reported. Reporting may be performed in the same way as for a "not used" event. Once the bicycle is removed process flow continues to end step 665 and the dock may enter a standby, or low-power consumption mode.

Figure 8:
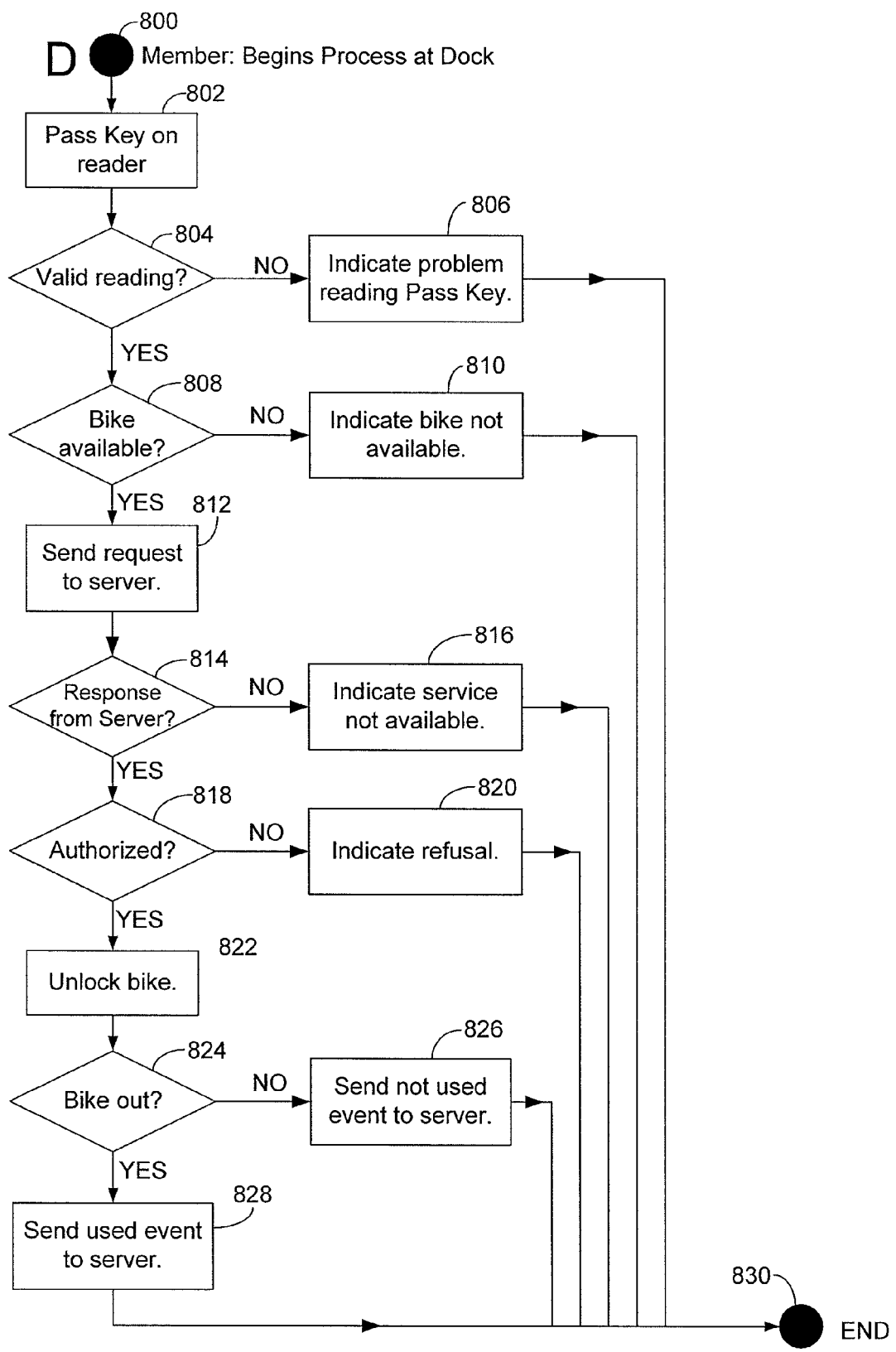
FIG. 8 is a process flow diagram of a bicycle rental process that may be performed by a parking payment/bicycle rental station according to an embodiment of the invention.

FIG. 8 is a process flow diagram showing a rental process for a member when performed at bicycle dock 131. At step 802 a pass key or member card is read. If the reading is invalid (step 804), an indication of such is made at step 806 and the process flow is ended (step 830).

If the reading is valid (step 804) it is determined if the bike is available for use (step 808). If the bicycle is not available, an indication of such is made at step 810 and process flow is ended (step 830).

If the bicycle is available, a request for rental is made (step 812). For example, a request may be sent to the hosting center 300 via ioctl module 120 and meter 110. At step 814 a response from the server is anticipated. If no response is received an indication of such is made (step 816) and process flow is ended (step 830).

If a response from the server is received (step 814), process flow continues to step 818 where it is determined if the request was authorized. If the request was not authorized, an indication of refusal is made (step 820) and process flow is ended (step 830).

If the request is authorized (step 818), the bicycle is unlocked (step 822).

After a predetermined time step 824 is performed. At step 824 the bicycle dock determines if the bicycle has been removed. If the bike has not been removed, process flow continues to step 826 where the lock is secured, and a "not used" event is reported. This event may be reported to meter 110 via ioctl module 120, and may further be reported to hosting center 300 for recordation. This may lead bicycle dock 131 to continue to end step 830.

If the bicycle is detected to have been removed at step 824 a "used" event is reported. Reporting may be performed in the same way as for a "not used" event. Once the bicycle is removed process flow continues to end step 830.

At end step 830 the bicycle dock 131 may enter a standby, or low-power consumption mode.

Figure 9:
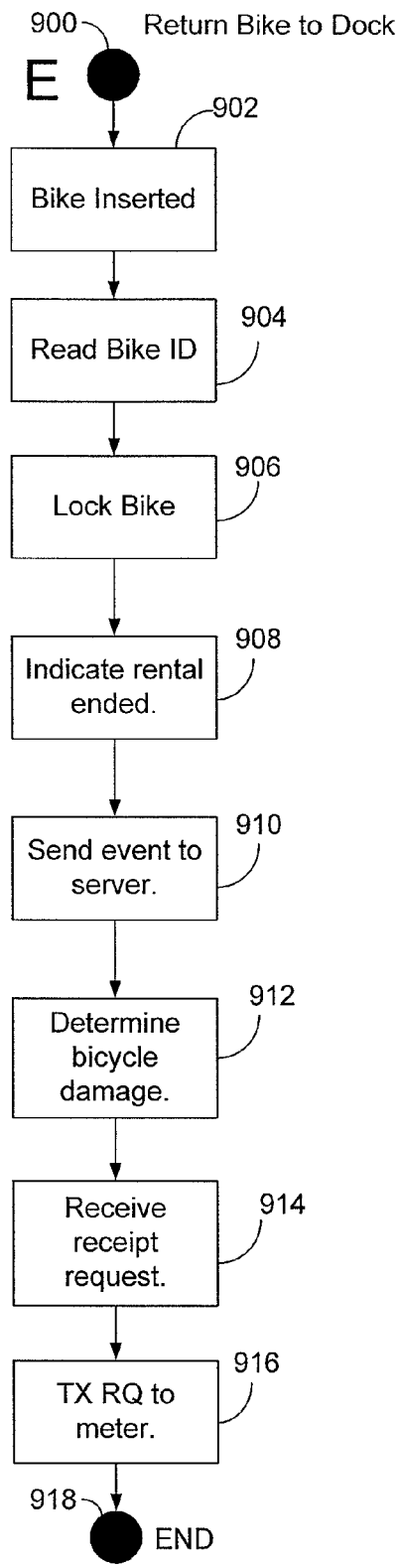
FIG. 9 is a process flow diagram of a bicycle rental return process that may be performed using a parking payment and bicycle rental station according to an embodiment of the invention.

FIG. 9 is a process flow diagram performed when a bicycle is returned to a bicycle dock 131. The process begins at E 900.

At step 902 it is detected that a bicycle 150 has been inserted into the bicycle dock 131. At step 904 the bicycle is identified. In some embodiments identification is performed using RFID.

Process flow continues to step 906 where the bicycle is secured using the locking mechanism 132.

An indication may then be made that the rental is ended (step 908). A report is made that the rental has ended (step 910). The report may be transmitted to the hosting center 300 via ioctl module 120 and meter 110.

At step 912 damage to the bicycle may be reported. In some embodiments damage may be reported by the customer. The report may be transmitted to the hosting center 300 via ioctl module 120 and meter 110.

At step 914 a customer indicates the desire for a receipt. At step 916 the receipt request is transmitted to meter 110 and printed by printer 113. Process flow is terminated at step 918.

Additional Embodiments

Having thus described several aspects of at least one embodiment of this invention, it is to be appreciated that various alterations, modifications, and improvements will readily occur to those skilled in the art.

For example, various aspects and advantages are described. Not every embodiment may include every aspect or provide every described advantage. For example, a solar powered bicycle rental station is described. Integration of a bicycle rental system into a parking payment and management system is also described. These aspects may be combined, using solar power for a station that provides both parking payment and management functions and bicycle rental stations. Though, an integrated bicycle rental and parking payment and management system may employ stations that draw power from wired AC sources.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A bicycle rental station adapted for use in conjunction with a payment station, the bicycle rental station comprising:
   a solar panel;
   a trigger mechanism configured for activation by user action;
   an energy storage device coupled to receive energy from the solar panel;
   a wireless transmitter operable in a low-power consumption mode and a higher-power consumption mode; and
   a plurality of bicycle docks, each bicycle dock comprising an electronic element operable in the low-power consumption mode and the higher-power consumption mode, wherein,
   each electronic element and the wireless transmitter are coupled to receive energy from the energy storage device; and
   the bicycle rental station is configured to, in response to activation of the trigger mechanism, place at least one of the electronic elements and the transmitter in the higher-power consumption mode from the low-power consumption mode to transmit information from the bicycle dock to the payment station.

2. The bicycle rental station of claim 1, wherein the plurality of bicycle docks are divided among one or more bicycle modules, each bicycle module adapted to connect to one or more adjacent bicycle modules.

3. The bicycle rental station of claim 2, wherein the electronic element comprises a receiver for short-range wireless communications, each receiver positioned to receive wireless communications from a tag affixed to a bicycle.

4. The bicycle rental station of claim 1, in combination with the payment station, the payment station being configured to receive power from the energy storage device and comprises a user interface to facilitate bicycle rental and parking payment.

5. The bicycle rental station of claim 4, further comprising:
   an ioctl module that polls the plurality of bicycle docks to determine if the trigger mechanism has been activated.

6. The bicycle rental station of claim 5, wherein:
   the wireless transmitter is within the ioctl module, the wireless transmitter further for receiving authorization data from the payment station.

7. The bicycle rental station of claim 4, wherein the payment station further comprises a modular display socket, the modular display socket adapted to couple to and mechanically secure any display of a group, the group comprising at least two displays.

8. The bicycle rental station of claim 7, wherein the group comprises a monochrome display and a full-color display.

9. The bicycle rental station of claim 7, wherein the group comprises a first display and a second display, the first display having a smaller screen size than the second display.

10. A method of operating a bicycle rental station, the method comprising: placing a portion of the bicycle rental station in a low-power consumption mode, the portion comprising electronics configured to operate in the low-power consumption mode and a higher-power consumption mode; storing solar energy collected by a solar panel in an energy storage device; powering the electronics of the portion of the bicycle rental station from the energy storage device in the higher-power consumption mode in response to activation of a trigger mechanism.

11. The method of claim 10, wherein the trigger mechanism is mechanical.

12. The method of claim 11, wherein a pass card activates the trigger mechanism, whereby the portion of the station is powered in the higher-power consumption mode in response to the pass card being read.

13. The method of claim 11, wherein placing a bicycle in a bicycle dock activates the trigger mechanism, whereby the portion of the station is powered in the higher-power consumption mode in response to the bicycle being placed in the dock.

14. The method of claim 13, wherein the portion of the station that is powered in the higher-power consumption mode comprises an RFID reader located at the bicycle dock.

15. The method of claim 14, further comprising:
   performing a reading with the RFID reader while powering the portion in the higher-power consumption mode.

16. The method of claim 15, wherein the portion of the station comprises a locking mechanism located at the bicycle dock, the method further comprising:
   locking the locking mechanism securing the bicycle at the bicycle dock.

* * * * *

US007898439C1

(12) INTER PARTES REEXAMINATION CERTIFICATE (965th)
United States Patent
Bettez et al.

(10) Number: US 7,898,439 C1
(45) Certificate Issued: Sep. 29, 2014

(54) BICYCLE RENTAL SYSTEM AND STATION

(76) Inventors: Isabelle Bettez, Vaudreuil-sur-le-Lac (BT); Jean-Sebastien Bettez, Hudson (CA)

Reexamination Request:
No. 95/001,974, Apr. 20, 2012

Reexamination Certificate for:
Patent No.: 7,898,439
Issued: Mar. 1, 2011
Appl. No.: 12/052,309
Filed: Mar. 20, 2008

(51) Int. Cl.
*H04B 14/00* (2006.01)
(52) U.S. Cl.
USPC ........... 340/999; 194/205; 194/247; 194/902; 235/381; 235/382; 340/432; 340/543; 340/568.1; 70/233; 70/57
(58) Field of Classification Search
None
See application file for complete search history.

(56) References Cited

To view the complete listing of prior art documents cited during the proceeding for Reexamination Control Number 95/001,974, please refer to the USPTO's public Patent Application Information Retrieval (PAIR) system under the Display References tab.

*Primary Examiner* — Cameron Saadat

(57) ABSTRACT

A bicycle rental system and automated station that may be integrated with an automobile parking payment and management system. Users may pay for parking and/or rent and pickup bicycles at the station. The station has a meter, bicycle docks, and power plant. Transaction formalities for parking payment and rental may be handled at the meter. The bicycle docks each are adapted to secure a bicycle. The power plant uses a solar panel to collect power and stores it in energy storage device. Low-power operation may be achieved by placing some electronics in a low-power mode. Each bicycle dock may have a trigger mechanism that when activated powers on associated electronics. The bicycle docks may be divided among a number of bicycle modules. The bicycle modules provide flexibility and modularity so that the number of bicycle docks at a station may be changed.

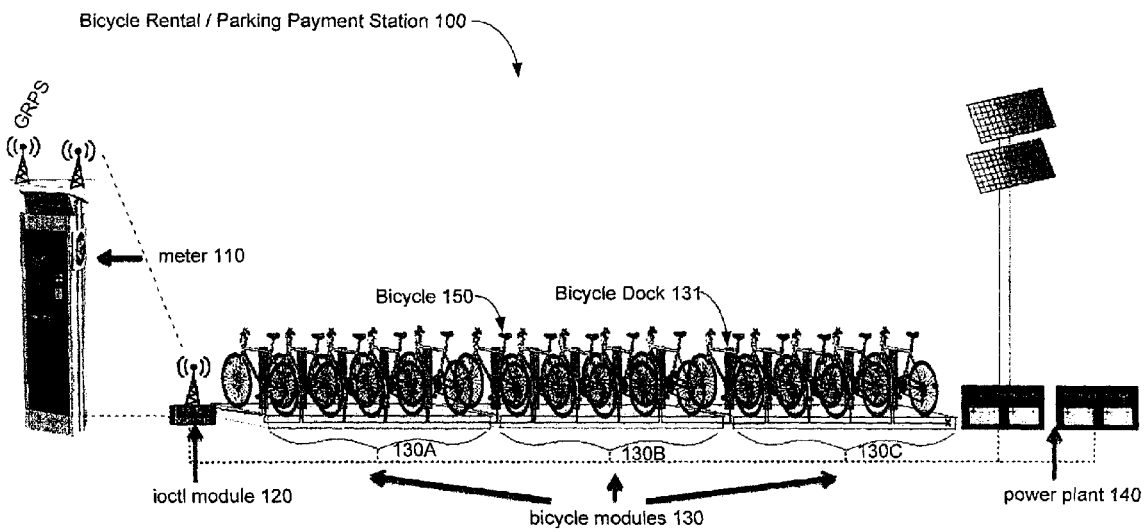

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-9 is confirmed.

Claim 10 is cancelled.

Claim 11 is determined to be patentable as amended.

Claims 12-16, dependent on an amended claim, are determined to be patentable.

New claims 17 and 18 are added and determined to be patentable.

11. [The method of claim 10,] *A method of operating a bicycle rental station, the method comprising:*

*placing a portion of the station in a low-power consumption mode, the portion comprising electronics configured to operate in the low-power consumption mode and a higher-power consumption mode;*

*storing solar energy collected by a solar panel in an energy storage device;*

*powering the electronics of the portion of the station from the energy storage device in the higher-power consumption mode in response to activation of a trigger mechanism,* wherein the trigger mechanism is mechanical.

*17. The bicycle rental station of claim 1, wherein:*

*each of the plurality of bicycle docks is shaped and configured to receive and selectively lock a pedal powered bicycle.*

*18. The method of claim 11, wherein the mechanical trigger mechanism is activated by user action at the bicycle rental station.*

\* \* \* \* \*